United States Patent
Goncalves

(10) Patent No.: US 9,841,016 B2
(45) Date of Patent: Dec. 12, 2017

(54) CRYOGENIC, SELF-ALIGNING CARTRIDGE SEAL

(71) Applicant: FSI North America, Inc., Coraopolis, PA (US)

(72) Inventor: Jorge Goncalves, Gauteng (ZA)

(73) Assignee: FSI North America, Inc., Coraopolis, PA (US)

( * ) Notice: Subject to any disclaimer, the term of this patent is extended or adjusted under 35 U.S.C. 154(b) by 0 days.

(21) Appl. No.: 15/149,471

(22) Filed: May 9, 2016

(65) Prior Publication Data

US 2017/0184094 A1    Jun. 29, 2017

Related U.S. Application Data

(60) Provisional application No. 62/271,464, filed on Dec. 28, 2015.

(51) Int. Cl.
*F16J 15/3256* (2016.01)
*F04B 53/14* (2006.01)
*F16J 15/34* (2006.01)

(52) U.S. Cl.
CPC ......... *F04B 53/143* (2013.01); *F16J 15/3256* (2013.01); *F05B 2240/57* (2013.01); *F16J 15/348* (2013.01)

(58) Field of Classification Search
CPC .. F16J 15/3256; F16J 15/3264; F04B 53/143; F05B 2240/57
USPC .......................................................... 277/371
See application file for complete search history.

(56) References Cited

U.S. PATENT DOCUMENTS

| 2,499,353 | A | * | 3/1950 | Brummer | ................ | F16J 15/36 |
| | | | | | | 277/371 |
| 3,413,008 | A | * | 11/1968 | Greiner | ................. | B63H 23/36 |
| | | | | | | 277/505 |
| 3,918,724 | A | * | 11/1975 | Alley | .................. | F16J 15/3464 |
| | | | | | | 277/500 |
| 4,219,202 | A | | 8/1980 | Koch | | |
| 4,328,973 | A | * | 5/1982 | Delbridge | ................ | F16J 15/40 |
| | | | | | | 277/304 |
| 4,434,986 | A | | 3/1984 | Warner | | |
| 4,538,821 | A | | 9/1985 | Wallace | | |

(Continued)

FOREIGN PATENT DOCUMENTS

CH    EP 1087144 A2 *  3/2001 ........... F04D 29/126
EP    1087144 B1    11/2005

*Primary Examiner* — Eugene G Byrd
(74) *Attorney, Agent, or Firm* — McKay & Associates, P.C.

(57) ABSTRACT

A mechanical seal of the cartridge type for a cryogenic pump. A stationary subassembly attaches to a pump casing, the stationary subassembly running against the flat surface of a rotary subassembly to thereby provide a sealing face. The stationary subassembly defines an inner seal cavity and further comprises a gland and a packing plate attached to the gland, the packing plate having a front face and back face, wherein the back face is angled to be non-parallel with the front face such that ice and moisture from the cryogenic pump is directed away from the inner seal cavity. A shroud over the drive ring for sealing disposition against the shaft shields ice and moisture ingress into the inner seal cavity. Lock wire holes defined within the collar screw and drive collar allow a lock wire to prevent loosening of the collar screw to prevent sparking.

9 Claims, 2 Drawing Sheets

(56) References Cited

U.S. PATENT DOCUMENTS

| | | | | |
|---|---|---|---|---|
| 4,560,173 A | * | 12/1985 | Adams | F16J 15/162 277/367 |
| 4,639,000 A | | 1/1987 | Warner | |
| 4,848,776 A | * | 7/1989 | Winckler | F16J 15/3256 277/349 |
| 4,872,689 A | | 10/1989 | Drumm | |
| 5,344,164 A | * | 9/1994 | Carmody | F16J 15/3472 277/371 |
| 5,529,315 A | * | 6/1996 | Borrino | F16J 15/004 277/352 |
| 5,873,574 A | * | 2/1999 | Ringer | F16J 15/3476 277/348 |
| 6,386,546 B1 | * | 5/2002 | Fedorovich | F16J 15/164 277/351 |
| 7,144,015 B2 | * | 12/2006 | Roberts-Haritonov | F16J 15/3484 277/361 |
| 8,042,813 B2 | * | 10/2011 | Kung | F16J 15/348 277/370 |
| 8,931,783 B2 | * | 1/2015 | Quarmby | F16J 15/3404 277/370 |
| 8,985,587 B2 | * | 3/2015 | Alfes | F16J 15/3484 277/370 |
| 2005/0134002 A1 | * | 6/2005 | Elliott | F04D 29/126 277/371 |
| 2006/0082071 A1 | * | 4/2006 | Roddis | F16J 15/3404 277/371 |
| 2010/0201075 A1 | * | 8/2010 | Roddis | F16J 15/164 277/402 |
| 2013/0094795 A1 | * | 4/2013 | Hosmer | F16C 33/76 384/482 |

\* cited by examiner

US 9,841,016 B2

CRYOGENIC, SELF-ALIGNING CARTRIDGE SEAL

CROSS-REFERENCE TO RELATED APPLICATIONS

The present application claims benefit of provisional application Ser. No. 62/271,464, filed Dec. 28, 2015, the contents of which are incorporated herein by reference.

BACKGROUND

Field of the Invention

The instant invention relates to seals of the cartridge type. In particular, described is a seal for cryogenic pump sealing use, wherein the stationary elements and rotary elements are all well suited to maintain function in the cryogenic environment and contain pre-installed seal parts for a self-aligning design.

Description of the Related Art

End user setting and assembly of a mechanical seal can be difficult, time-consuming, and increases the margin of error. Calculations, measurements and a variety of installation tools may be required to insure geometric alignment and correct position of the seal.

Cryogenic seals are used for the containment mechanisms for cryogenic fluids, which are made of specialized fluids such as liquid oxygen, liquid nitrogen and various, low freezing-point gasses. Various techniques, including soldering and welding are available for creating seals, however specialized materials and processes are necessary to hermetically entrap cryogenic constituents under vacuum-tight conditions. Additionally, current cryogenic seals are not in cartridge form. They are supplied as separate parts, for installation by a skilled fitter.

There is a need then for a seal assembly which is self-aligning and which eliminates complicated end user setting requirements while be capable of sealing specialized, cryogenic fluid environments.

SUMMARY

It is the objective of the present invention to provide a seal for a cryogenic pump application including rotary and stationary elements which become truly self-aligned upon placement, and which are unaffected by axial movement on start up as loading and unloading is interchanged.

It is further an objective of the present invention to provide a seal assembly which eliminates complicated end user setting requirements while be capable of sealing specialized, cryogenic fluid environments.

Accordingly, the instant seal comprehends a rotary subassembly having a down-shaft end and up-shaft end, the rotary subassembly including a mating ring at the down-shaft end to provide a flat surface; and, a stationary subassembly attached to a pump casing of the cryogenic pump, the stationary subassembly running against the flat surface to thereby provide a sealing face, the stationary subassembly defining an inner seal cavity and further comprising a gland and a packing plate attached to the gland, the packing plate having a front face and back face, wherein the back face is angled to be non-parallel with the front face such that ice and moisture from the cryogenic pump is directed away from the inner seal cavity.

In one embodiment, a first bellow is connecting the mating ring to the sleeve; a second bellow within the inner seal cavity is in alignment with the first bellow to impart an axial load against the sealing face; and, a gland o-ring is within the gland, the gland o-ring positioned within the gland such that the gland can be in sealing disposition with a pump casing of the cryogenic pump.

Additionally, a drive subassembly up-shaft from the rotary subassembly includes: a drive collar adapted to fix to a shaft of the cryogenic pump; a drive ring disposed against the drive collar; and, a shroud over the drive ring for sealing disposition against the shaft to shield ice and moisture ingress into the inner seal cavity.

DETAILED DESCRIPTION OF THE PREFERRED EMBODIMENT

Figure 1:
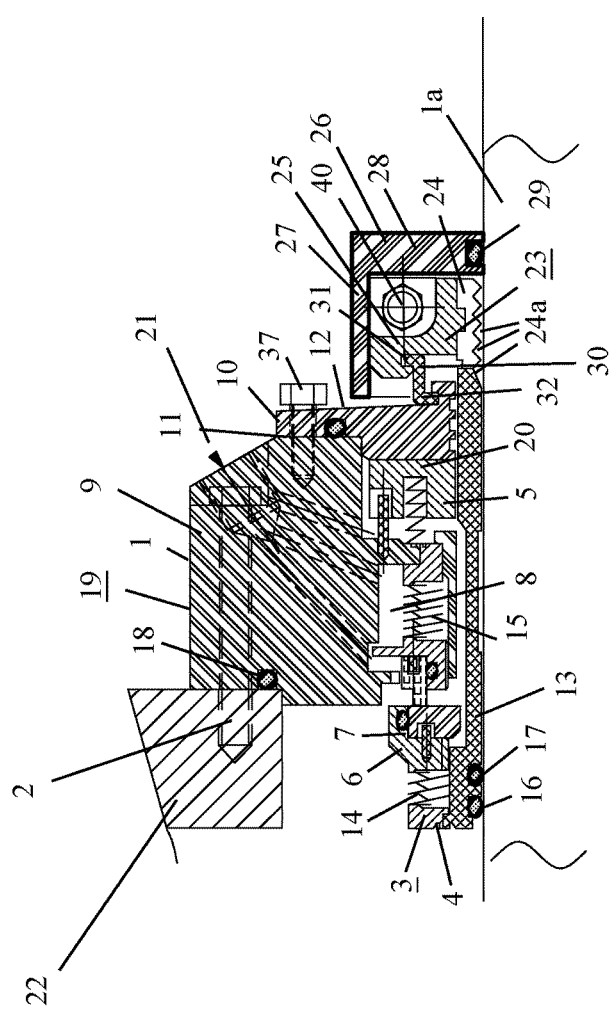
FIG. 1 shows a partial, cross-sectional view of the instant seal along a shaft (through an x-y plane).
Figure 2:
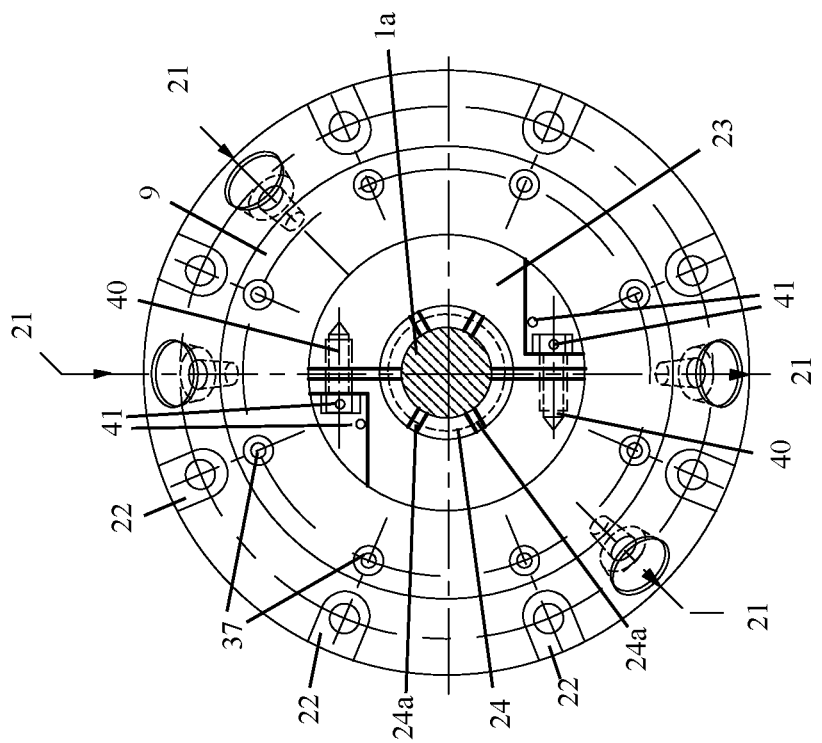
FIG. 2 shows an axial, down-shaft view (in z-y plane) in elevation of the instant seal (without shroud).

Referencing then FIGS. 1 and 2, shown is the instant seal 1 of the cartridge type in that it is especially suited as a prepackaged seal for the complex application of a vertical, cryogenic pump where a component type seal would be difficult to employ due to the equipment design. The instant design is appropriate for any cryogenic pump, from any manufacturer.

FIG. 1 shows a partial view in that the cross-section is for one-half of the entire seal 1 assembly, it being understood that the seal 1 encircles the entire shaft 1a, the bottom (not shown) being a mirror image of FIG. 1. Accordingly, "a" as used in the claims means one or more where appropriate. With 'x' being the axis through shaft 1a, the cross-sectional view here is through the x-y plane, and thus the FIG. 2 view is through the z-y plane, but here shown in end view in elevation.

With continued reference to FIGS. 1 and 2, rotary subassembly 3 is the rotating component of seal 1 with pump shaft 1a running against stationary subassembly 19. Rotary subassembly 3 has a downshaft end 4 and an upshaft end 5 relative to the location of pump casing 2, i.e. traveling downshaft means past pump casing 2 into pump. A mating ring 6 is formed at downshaft end 4 to provide sealing face 7, which is the flat surface of the rotary subassembly 3 which runs against and thereby forms a seal or barrier between rotary subassembly 3 and stationary subassembly 19 as is known in the art. Here, sealing face 7 is the location where composite meets heat treated #4SS 55/58 HRC for example. Moreover, traditionally, cryogenic seal pump manufacturers physically clamp their rotary subassemblies 3 in place, by the action of tightening the pump impeller on to the shaft 1a. But here, the mating ring 6 is not clamped, thereby eliminated mechanical stress.

Rotary subassembly 3 includes a sleeve 13 packed against and underlying the mating ring 6 adapted to be in sealing disposition with the shaft 1a. An outer surface along sleeve 13 forms part of the boundary of inner seal cavity 8. To aid in the seal, a primary o-ring 16 is inverted within the sleeve 13 with an adjacent secondary o-ring 17 slightly upshaft from downshaft end 4, also inverted and aligned axially with primary o-ring 16. "Inverted" means along the shaft-facing side of sleeve 13 such that the pair of o-rings, 16, 17 are in sealing disposition between shaft 1a and rotary subassembly 3. Additionally, a first bellow 14 (e.g. Inconel 718 alloy) connects mating ring 6 to the sleeve 13. A second bellow 15 is disposed within the inner seal cavity 8 in alignment with the first bellow 14 to thereby impart an axial load against the sealing face 7 in the absence of hydraulic pressure from the pump fluid. Additionally, the dual metal bellows 14, 15 help enable the seal 1 to be built in a full cartridge form for cryogenic service, thereby reducing the possibility of installation error.

The stationary subassembly 19 is for attachment to the pump casing 2 of the cryogenic pump. Stationary subassembly 19 defines inner seal cavity 8 as above and further includes gland 9 and a packing plate 10 attached to the gland 9. A gland o-ring 18 is disposed within gland 9 and positioned such that it is in sealing disposition with pump casing 2. Gland 9 is fastened to pump casing 2 using pump fixing bolt 22 therethrough as shown. As such, the gland 9 centers the seal components, supports the stationary components, as further described, and provides the port location for the flush arrangement 21.

The packing plate 10, or labyplate, has a front face 11 and a back face 12. In the preferred embodiment the packing plate 10 is made of bronze. The packing plate 10 is fastened to and thereby packs against gland 9 using packing pin 37 and an additional o-ring. To minimize and direct leaking, a floating bush assembly 20 is in contact with packing plate 10. Additionally, critically for this application, the back face 12 of packing plate 10 is angled to be non-parallel with the front face 11. By being non-parallel this means the back face 12 would not be perpendicular, or trans-axial, to shaft 1a, but it would angle slightly downward when placed along a vertical shaft. As such, ice and moisture from the cryogenic pump is better directed away from the inner seal cavity 8.

A drive subassembly 23 is the additional subassembly of the assembled seal 1 and is connected to rotary subassembly 3 up-shaft therefrom. Drive subassembly 23 includes a drive collar 25 adapted to fix around shaft 1a via collar screws 40 which thereby join two halves of the drive subassembly 23 around shaft 1a. Drive collar 25 is of the split-collar type. Drive collar 25 maintains the sealing relationship of sealing face 7 by, in part, prohibiting axial movement. Drive collar 25 is connected to packing plate 10 and thus connects drive subassembly 23 to stationary subassembly 19 by providing a sacrificial setting ring 30, preferably made of PTFE. Setting ring 30 is Z-shaped in cross-section having a first projection 31 and a second projection 32, with the first projection 31 engaging the drive collar 25 as shown, and the second projection engaging the packing plate 10.

As an added safety feature, lock wire holes 41 (shown on FIG. 2 only) are defined within each collar screw 40 and on the drive collar 25 (a pair of lock wire holes 41 per section of drive assembly 23, namely one on drive collar 25 and one on the collar screw 40 or head of the collar screw 40 as shown). In this manner, a lock wire can pass through the lock wire holes 41. The lock wire thereby further secures the collar screw 40 to prevent the collar screws 40 from loosening and causing a spark in an oxygen-rich environment.

A drive ring 24 underlies drive collar 25. Defined within drive ring 24 are multiple drive slots 24a. Shown here in the preferred embodiment numbering six slots 24a, the slots 24a are shown on the end view of the drawing defined projecting radially from the pump shaft 1a. Slots 24a are axially cut to enable the sleeve 13, when the drive collar 25 is tightened, to crimp circumferentially on to the shaft 1a to lock in place without causing damage to the pump shaft 1a. Traditionally a series of screws, radially spaced, are used, but these work loose and can damage the pump shaft 1a.

A shroud 26 is positioned over the drive collar 25. Shroud 26 is defined by horizontal member 27 and vertical member 28 to be L-shaped in cross-section. A shroud o-ring 29 is inverted within vertical member 28 to be in sealing disposition with the shaft 1a. Shroud 26 thereby shields ice and moisture ingress into the inner seal cavity 8.

Accordingly, as provided by the above features, the seal 1 is well-suited for cryogenic service with enhanced safety features, no induced stress and distortion and a true self-aligning design capable of accommodating axial and geometric misalignment.

I claim:

1. A cartridge seal for a cryogenic pump, comprising:
   a rotary subassembly having a downshaft end and an upshaft end, said rotary subassembly further comprising:
   a mating ring at said downshaft end to provide a flat surface;
   a sleeve packed against and underlying said mating ring adapted to be in sealing disposition with a shaft;
   a first bellow connecting said mating ring to said sleeve;
   a primary o-ring inverted within said sleeve;
   a secondary o-ring inverted within said sleeve;
   a stationary subassembly defining an inner seal cavity and further comprising a gland and a packing plate attached to said gland, said stationary subassembly further comprising:
   a second bellow within said inner seal cavity in alignment with said first bellow to impart an axial load against said sealing face;
   a gland o-ring within said gland, said gland o-ring positioned within said gland such that said gland can be in sealing disposition with a pump casing of said cryogenic pump; and,
   a floating bush subassembly in contact with said packing plate.

2. The cartridge seal of claim 1, further comprising a flush arrangement within said gland.

3. The cartridge seal of claim 1, further comprising a pump fixing bolt through said gland for fastening said stationary subassembly to said pump casing.

4. A cartridge seal for a cryogenic pump, comprising:
   a rotary subassembly having a downshaft end and upshaft end, said rotary subassembly including a mating ring at said downshaft end to provide a flat surface; and,
   a stationary subassembly defining an inner seal cavity and further comprising a gland and a packing plate attached to said gland;
   a drive subassembly upshaft from said rotary subassembly, said drive collar assembly further comprising:
   a drive collar adapted to fix around a shaft of said cryogenic pump;
   a shroud over said drive collar for sealing disposition against said shaft to shield ice and moisture ingress into said inner seal cavity; and,
   a drive ring underlying said drive collar, said drive ring having defined therein multiple drive slots defined radially from said shaft.

5. The cartridge seal of claim 4, wherein said shroud has a horizontal member and a vertical member to be L-shaped in cross-section.

6. The cartridge seal of claim 5, further comprising a shroud o-ring inverted within said vertical member.

7. The cartridge seal of claim 4, further comprising a sacrificial setting ring between said drive collar and said packing plate.

8. The cartridge seal of claim 7, wherein said sacrificial setting ring is Z-shaped in cross-section having a first projection and a second projection, said first projection engaging said drive collar, said second projection engaging said packing plate.

9. A cartridge seal for a cryogenic pump, comprising:
a rotary subassembly having a downshaft end and upshaft end, said rotary subassembly including a mating ring at said downshaft end to provide a flat surface; and,
a stationary subassembly defining an inner seal cavity and further comprising a gland and a packing plate attached to said gland;
a drive subassembly upshaft from said rotary subassembly, said drive collar assembly further comprising:
a drive collar adapted to fix around a shaft of said cryogenic pump;
a collar screw within said drive collar; and,
a pair of lock wire holes, one of said lock wire holes defined within said collar screw, and the other of said lock wire holes defined within said drive collar, wherein a lock wire can be passed through said pair of lock wire holes to prevent loosening of said collar screw such that sparking is prevented in an oxygen-rich environment.

* * * * *